United States Patent [19]

Reel

[11] Patent Number: 4,565,985

[45] Date of Patent: Jan. 21, 1986

[54] FILM COPYING APPARATUS

[76] Inventor: John M. Reel, 1361 Colo Rio Vista, Bullhead City, Ariz. 86430

[21] Appl. No.: 628,505

[22] Filed: Jul. 6, 1984

[51] Int. Cl.$^4$ .............................................. G03B 27/04
[52] U.S. Cl. ..................................................... 355/113
[58] Field of Search ........................... 355/113, 70, 115

[56] References Cited

U.S. PATENT DOCUMENTS

| | | | |
|---|---|---|---|
| 1,159,955 | 11/1915 | Kittredge | 355/113 |
| 2,356,385 | 8/1944 | Cooley | 355/113 |
| 2,366,722 | 1/1945 | Gaebel | 355/113 X |
| 2,692,540 | 10/1954 | Bing et al. | 355/113 X |
| 3,221,631 | 12/1965 | Bernstein | 355/113 |
| 3,630,614 | 12/1971 | Kazle | 355/115 X |
| 3,761,176 | 9/1973 | Lewer | 355/115 X |
| 3,888,586 | 6/1975 | Arden et al. | 355/113 X |

FOREIGN PATENT DOCUMENTS 7804350 10/1979 Netherlands ........................ 355/113

*Primary Examiner*—Richard A. Wintercorn
*Attorney, Agent, or Firm*—Whann & McManigal

[57] ABSTRACT

Film copying apparatus especially for copying a negative film such as an X-ray film upon an underlying sensitized film by exposure to light rays for a predetermined timed interval. The apparatus comprises a four-sided frusto-pyramidal housing structure in which an outer housing formed from a folded sheet of plastic material and an inner housing of a light reflecting metal are secured in nested relation and coact to provide a light chamber having a bottom light transmitting opening that is spanned by a transparent light transmitting window. A flat base member coextensive with the window is provided with an upper surface of a soft compressible material and is connected at one edge to one side of the outer plastic housing by hinges which permit the housing structure to be tilted to an open position to enable placement of the light sensitized film and superposed film negative on the compressible material of the base member, and to a closed position with the light transmitting window overlying and pressing against the film negative. The hinges have a floating connection with the housing structure, whereby the weight of the housing structure will be uniformly applied and operate to hold the film negative and the sensitized film in engagement during exposure.

11 Claims, 6 Drawing Figures

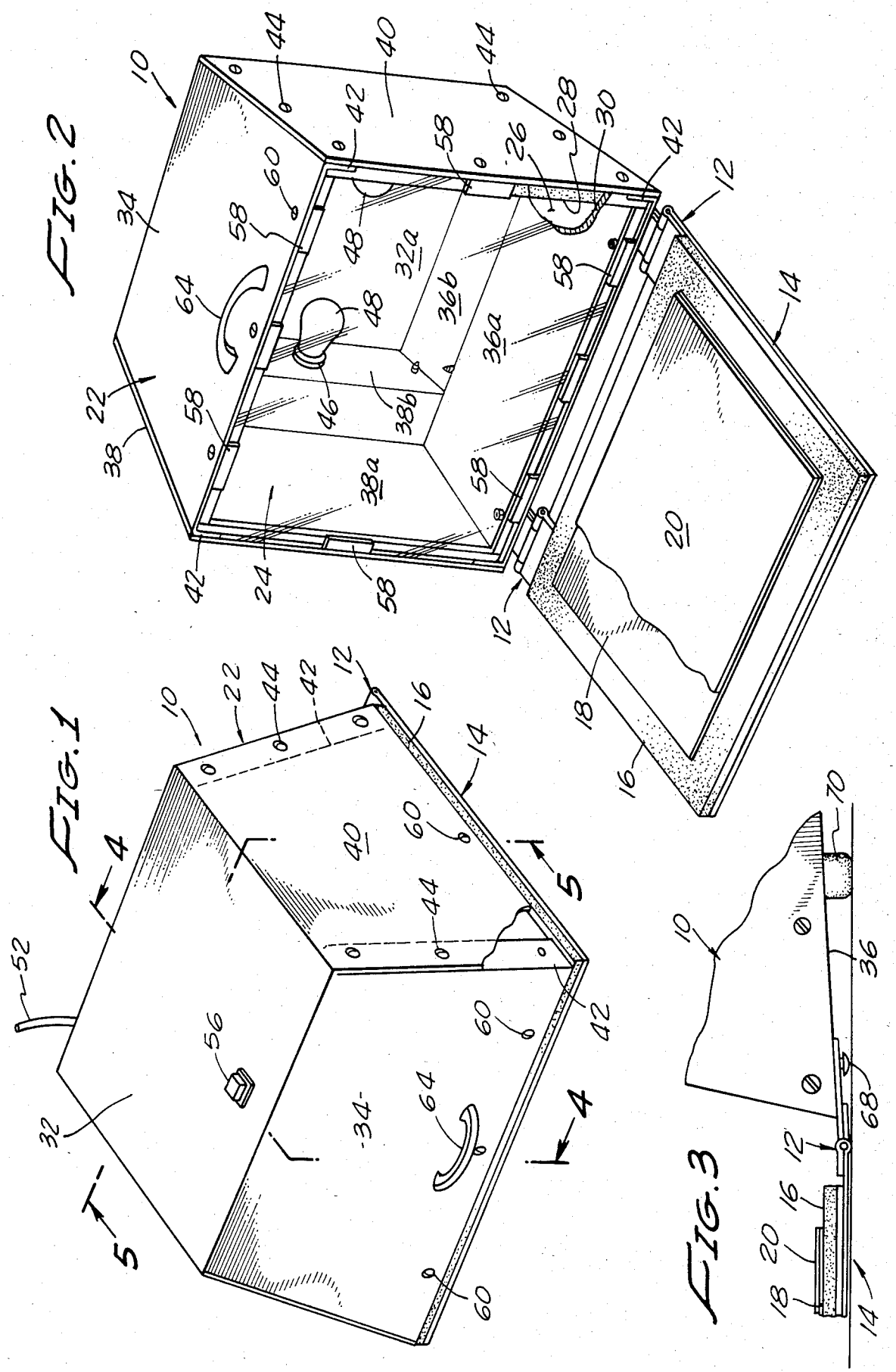

FILM COPYING APPARATUS

PRIOR ART

In the prior art there are a number of contact photographic printing machines in which film negatives and the like are copied upon an underlying sensitized film by exposure to light rays for a controlled time interval. The closest art known to applicant are the following patents:

U.S. Pat. No. 2,674,933—Apr. 13, 1954
U.S. Pat. No. 3,067,666—Dec. 11, 1962
U.S. Pat. No. 3,630,614—Dec. 28, 1971
U.S. Pat. No. 3,765,762—Oct. 16, 1973
U.S. Pat. No. 4,343,549—Aug. 10, 1982

BACKGROUND OF THE INVENTION

The present invention relates generally to photographic copying apparatus, and is more particularly concerned with apparatus for copying X-ray negative films on an underlying sensitized film by a controlled time exposure to a source of light rays. 2

Having reference to the prior art patents noted above, it will be seen that it has been generally known to provide a light chamber containing a light source from which light rays are conducted through a window or diffusing screen to a film negative which is held in contact with a sensitized film which is thus exposed for a predetermined time interval. Such procedure is conventional and well known in the photographic industry.

The known prior art structures differ primarily in the structural arrangement of the device or apparatus for carrying out such photographic procedures, and in the main differ primarily in the manner in which the film negative that is to be copied is maintained in pressure contact engagement with the sensitized film while being subjected to light rays emanating from the light source contained in an associated light chamber.

In general, the prior art devices have embodied rather complicated structures which are expensive to manufacture, and embody relatively complicated procedures in use.

In the photographic copying apparatus of U.S. Pat. No. 2,674,933, a box-like structure contains a light chamber having a top transparent platen upon which the drawing, film or the like is placed with an overlying sheet of photographic paper which are maintained in pressure contact by a spring pressed pressure pad carried by a hinged cover, when swung to closed clamped position.

The U.S. Pat. No. 3,067,666 discloses apparatus for overhead projection slides in which an assemblage of the film to be exposed is inserted through a slot in the light chamber, and entails the use of a complex compression assembly mechanism for holding the film sheets in registration, and roller bearing members which permit this mechanism to be inserted and removed through the slot.

U.S. Pat. No. 3,630,614 discloses a copying machine for documents using a heat and light process, and utilizing a cabinet removably mounted on a base, the cabinet providing a light chamber having an open face with a flat transparent rigid cover. The cabinet is hinged at one edge to the base which is held to the cabinet by means of rear hinges and a front clasp. The base is covered with a soft compressible sponge layer so that, when an original and a light sensitive intermediate is placed upon the base and the cabinet is lowered into position against the composite, the transparent plate will force the intermediate into close uniform pressure contact with the original against the compressible layer. As thus arranged, the exerted pressure is dependent upon the pressure of compressibility of the compressive layer.

U.S. Pat. No. 3,765,762 discloses an arrangement in which a light sensitive sheet is clamped between a flat translucent exposure surface and a foam rubber pad on the inner surface of a hinged top cover or lid for producing a uniform contact against the exposure surface. The top lid is provided with magnets or a pair of clamps with eccentrics to hold the lid in its closed position.

U.S. Pat. No. 4,343,549 discloses a box-type contact printer for photographic plate making, in which a lower frame and upper frame of transparent material are pivotally connected at their rear ends so that a photosensitive material and an original picture put thereon may be positioned between the two frames, and a shield box for covering the frames includes an exposure light source and a front opening adapted to be covered by a roll-up curtain. Provision is made for clamping the pivoted frames in closed position.

Briefly, the present invention seeks to provide a simplified and easily operable low cost film copying apparatus with a four-sided frusto-pyramidal housing structure which is fabricated to provide a light chamber having a bottom light transmitting window, which is hingedly connected to a flat base member provided with an upper surface of a soft compressible material. The base member is hingedly connected at one edge to one side of the housing structure for tilting movement thereof to an open position to enable the placement of a sensitized film and superposed film negative on the compressible material of the base member, and to a closed position with the light transmitting window overlying and pressing against the film negative to hold the film negative and the sensitized film in engagement during exposure.

The copying apparatus of the present invention embodies a number of desirable operating advantages and features, including the following:

a. Spring-biased platens and pressure plates, as used in the prior art structure, have been eliminated, and the inherent weight of the housing structure is utilized to hold the sensitized film and a superposed film negative in engagement during exposure to the light rays.

b. Another important feature resides in the utilization of a unique floating hinge connection between the housing structure and the base member, whereby the weight of the housing structure will be uniformly applied to the film negative and the operably associated sensitized film.

c. The housing structure has a four-sided frustropyramidal configuration and comprises an outer housing formed from a folded sheet of plastic material and an inner housing of a light reflecting metal, and which are secured in nested relation and coact to provide a light chamber. When the housing structure is moved to a tilted open position with respect to the hingedly connected base member, there is a tendency for the base member to be lifted at its hinged connected edge. This action is prevented by the provision of suitably placed bumpers in spaced relation to the hinged edge of the housing structure.

SUMMARY OF THE INVENTION

Having in mind the inherent structural and operating disadvantages of the known prior art film copying apparatuses, it is one object of the herein described invention to provide an improved film copying apparatus of simplified, relatively inexpensive construction, which is simple and efficient in operation, and which would require a minimum of maintenance over long periods of use.

A further object is to provide a unique film copying apparatus in which the housing structure defines a light chamber and is connected to a base member by a floating hinge connection for movement to an open position for receiving a film negative that is to be copied and a sensitized film, and which in a closed position utilizes the inherent weight of the housing structure to uniformly apply a holding pressure to the film negative and associated sensitized film during exposure to light rays from a source in the light chamber.

Another object is to provide in a film copying apparatus, a frusto-pyramidal housing structure having an outer housing formed from a folded flat plastic sheet and an inner nested metal housing, and wherein the inner and outer housing structures coact to define a light chamber, and in which a base member having a hinged connection with the housing structure is prevented from movement to a tilted position, when the housing structure is relatively moved to an open position, by means of bumper means carried by the housing structure.

Further objects, advantages and features of the invention will be brought out in the following part of the specification, wherein detailed description is for the purpose of fully disclosing an embodiment of the invention without placing limitations thereon.

BRIEF DESCRIPTION OF THE DRAWINGS

Referring to the accompanying drawings, which are for illustrative purposes only:

FIG. 1 is a perspective view of a film copying apparatus according to the present invention as it appears in an operative closed position;

FIG. 2 is a perspective view of the apparatus as it appears in an open position for the introduction of a packet containing a sensitized film and an overlying film negative to be copied or removed after exposure;

FIG. 3 is an enlarged fragmentary side elevational view showing the housing structure and hinged base member in open position, and a bumper on the housing to prevent it from tilting the base member;

DESCRIPTION OF THE DISCLOSED EMBODIMENT

Figure 4:
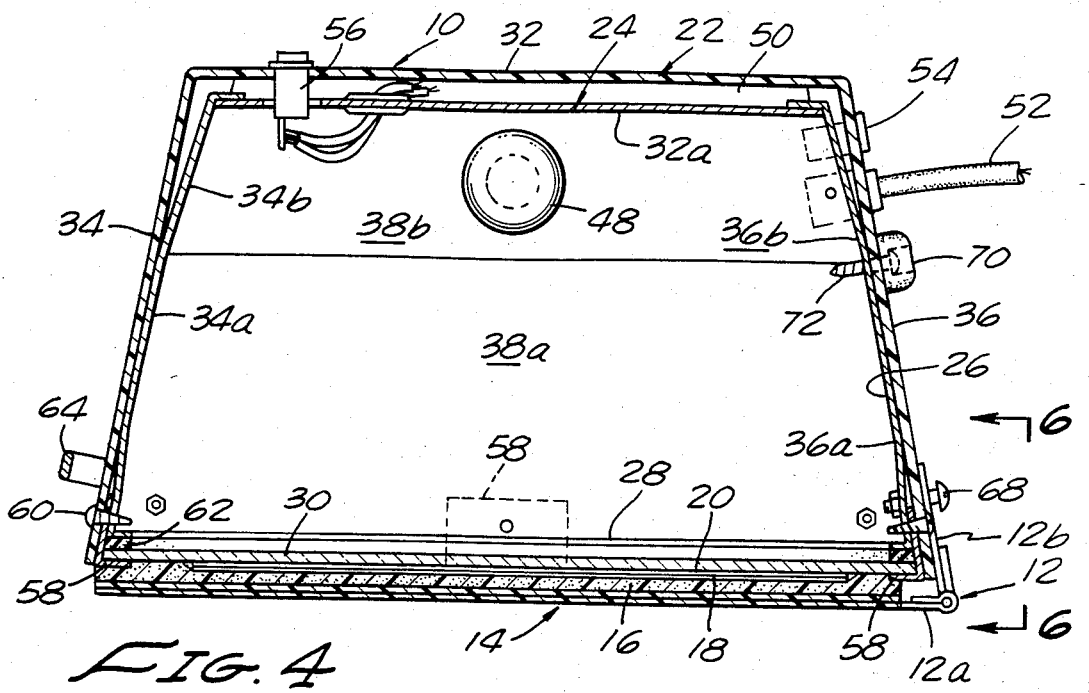
FIG. 4 is an enlarged sectional view, taken substantially on line 4—4 of FIG. 1.

Referring more specifically to the drawings, for illustrative purposes, the invention is best shown in FIGS. 1 and 2 as comprising a housing structure 10 connected by hinges 12 to a generally flat base member 14 for swinging movements between an operative closed position, as shown in FIG. 1, and an open position as shown in FIG. 2. As will be seen in FIG. 2, the base member 14 has its upper surface covered with a facing layer 16 of a suitable cushioning material such as sponge rubber or the like for receiving a packet or assembly composed of a sensitized film 18 and an overlying film negative 20 that is to be copied, such as an X-ray film, when the housing structure 10 is moved to a closed position as shown in FIG. 1 and exposed to light rays from a source carried within the housing structure.

The housing structure 10 is of a four-sided frusto-pyramidal configuration and consists of an outer housing as generally indicated by the numeral 22, and an inner housing as generally indicated by the numeral 24, these housings being positioned in nested relation and coacting to form an internal light chamber 26 having a bottom light transmitting opening 28 that is spanned by a transparent light transmitting window 30.

The outer housing embodies an inexpensive, unique structure that is fabricated from a sheet of a suitable plastic material which is cut and folded to form a top wall 32, front wall 34, rear wall 36, and side walls 38 and 40 respectively. The outer housing is secured in its folded configuration by providing folded flanges 42 respectively at the end edges of the front wall 34 and rear wall 36 which are secured in overlapping relation to the side walls 38 and 40 as by suitable retaining screws 44.

Figure 5:
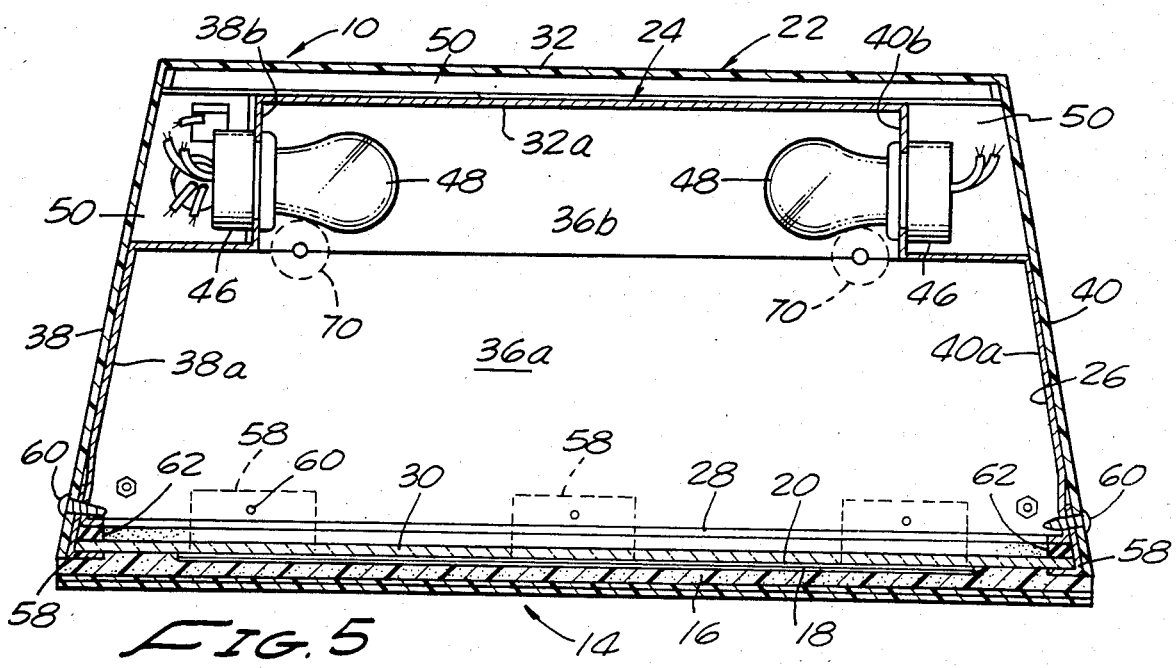
FIG. 5 is an enlarged sectional view, taken substantially on line 5—5 of FIG. 1.

As best shown in FIGS. 4 and 5, the inner housing is of generally the same configuration as that of the outer housing, but is fabricated from a sheet of suitable metal material to form a corresponding top wall 32a, front wall 34a, rear wall 36a and side walls 38a and 40a. As best shown in FIGS. 4 and 5, the side walls 38a and 40a adjacent to the top wall 32a are respectively inwardly offset to provide wall sections 38b and 40b upon which lamp sockets 46, 46 are respectively mounted for receiving light bulbs 48, 48 providing sources of light radiations in the light chamber. The front wall 34a and rear wall 36a are respectively provided with upper sections 34b and 36b which are upwardly and inwardly further inclined. As thus arranged, an internal cavity 50 is formed between the top portions of the inner housing and outer housing for the accommodation of the electric supply and control wiring for the light sources.

An extension cord 52 is arranged to supply 110 volt house current through a protective fuse 54 to a conventional manually operable on-off switch 56 mounted on the top wall 32 for manually controlling the energization and de-energization of the light sources 48 for a predetermined count period of exposure. Although it is not usually necessary, an automatic timer may be used, if desired, to control the light exposure interval.

The light transmitting window 30 is removably mounted to the housing structure 10, in a position spanning the bottom light transmitting opening 28, by means of a plurality of peripheral supporting L-shaped brackets 58, as best shown in FIGS. 4 and 5. One leg of this bracket is adapted to be inserted between the adjacent edge wall margins of the inner and outer housings and secured by means of a screw member 60 in each case, which also serves to removably secure the outer housing 22 and inner housing 24 in connected nested relation. The other leg of the bracket 58 is arranged to overlie the adjacent edge of the light transmitting window 30 and retain it against a peripherally extending cushioning strip 62 overlying the adjacent edge portions of the walls of the inner housing.

Provision is made for moving the housing structure 10 between an operative closed position as shown in FIG. 1 and an open position as shown in FIG. 2, by providing a handle member 64 which is secured to the front wall 34 of the outer housing. As thus arranged, it will be observed that no provision is made for clamping or otherwise retaining the housing structure 10 and the base member 14 in closed position, and in accordance with a primary feature of the present invention, the hinges 12 are arranged with a floating connection to the housing structure 10 which permits floating upward and downward movements of the housing structure with respect to the base member, and thus make it possible to utilize the inherent weight of the housing structure to be uniformly applied by the light transmitting window 30 against and over the upper surface of the packet containing the sensitized film 18 and the film negative 20 to be copied, and hold them against movement during the light exposure interval.

Figure 6:
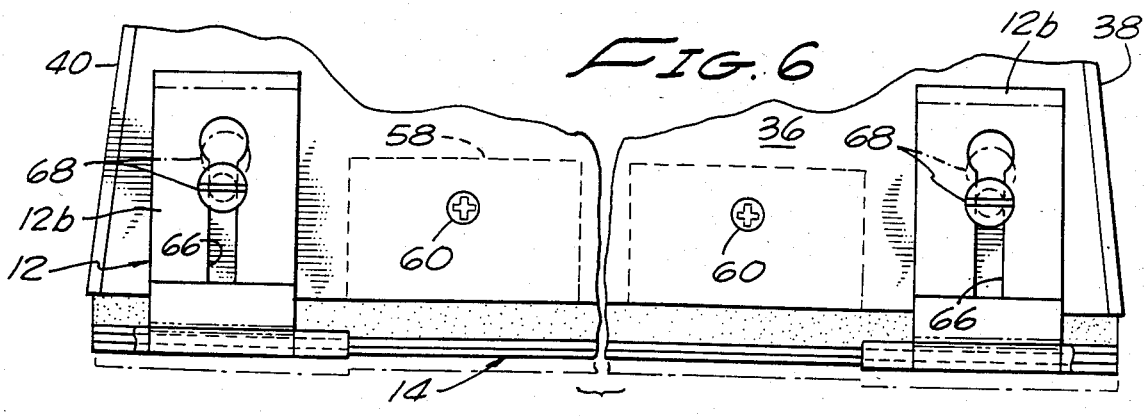
FIG. 6 is an enlarged fragmentary rear elevational view of the hinge connection between the housing structure and the base member, and showing details of the floating hinge structure.

As best shown in FIGS. 4 and 6, each of the hinges 12 is of the strap type and has one of its pivotally connected elements 12a fixedly secured to the base member 14 and its other pivoted element 12b floatingly connected with the bottom edge margin of the rear wall 36. This floating connection is obtained by providing an elongated keyhole slot 66 in which a headed bolt member 68, fixedly secured to the adjacent lower edge margin of the rear wall 36, is laterally slidably movable to permit raising and lowering movements of the housing structure 10 in its closed position, as indicated by phantom lines in FIG. 6. This floating movement readily enables the weight of the housing structure to be utilized as a holding force for maintaining the films of the packet in operative contact relationship during light exposure. This floating connection also enables the base member 14 to be readily detached from the housing structure 10 by simply moving the bolt member 68 to a position in which the head thereof may be withdrawn through the upper rounded end of the keyhole slot.

Having reference to FIG. 3, it has been found that due to the frustrum configuration of the housing structure 10 there is a tendency of the housing in the open position to fulcrum on the headed bolt members 68 of the hinges 12 in a manner to undesirably tilt the base member 14 and film packet thereon. This tendency has been eliminated by the provision of a bumper 70 which is secured to the rear wall 36 by a holding screw 72, and as shown in FIG. 3 serves to elevate the rear wall and the headed bolt members 68 above the adjacent supporting surface and prevent their functioning as a fulcrum in the open position of the housing structure 10.

From the foregoing description and drawings, it will be clearly evident that the delineated objects, features and advantages of the invention will be accomplished.

Various modifications may suggest themselves to those skilled in the art without departing from the spirit of the disclosed invention, and, hence, it is not wished to be restricted to the specific form shown or uses mentioned, except to the extent indicated in the appended claims.

I claim:
1. Film copying apparatus, comprising:
   a housing structure having walls defining a light chamber extending above a bottom light emitting opening;
   a light transmitting window member spanning said opening;
   a flat base member coextensive with and positioned below said window member and having an upper surface covering of a soft compressible material;
   hinge means connecting said housing structure to said base member for hinged swinging movement to an open position to enable the placement of a light sensitive film and a superposed film negative on the upper surface covering of said base member, and to a closed position with the window member in overlying engagement with the film negative; and
   in which said hinge means in said closed position are operable to enable raising and lowering movements between the housing structure and said base member, whereby the weight of the housing will be uniformly applied by said window member and operatively hold the film negative and light sensitive film in contact engagement.

2. Film copying apparatus according to claim 1, in which:
   said hinge means comprises a pair of hinges respectively having floating connections with said housing structure to enable raising and lowering movements of the housing on said base member.

3. Film copying apparatus according to claim 2, in which:
   each of said hinges embodies an elongate pivoted element having a longitudinally extending slot; and
   a headed member fixedly secured to the housing structure is positioned in and laterally movable along said slot.

4. Film copying apparatus according to claim 3, in which:
   said slot is enlarged at one end to a size permitting withdrawal of the headed member, and consequent disconnection of the hinge with respect to the housing structure.

5. Film copying apparatus according to claim 3, in which:
   said housing structure has a generally four-sided frustro-pyramidal configuration and in open position tends to fulcrum on the headed members of said hinges in a manner to undesirably tilt said base member with respect to a supporting surface; and
   a bumper positioned on a rear wall of said housing structure supports the housing and headed members above the supporting surface and thereby enables the base member to engage the supporting surface without being tilted.

6. Film copying apparatus according to claim 1, in which:
   said housing structure has a generally four-sided frusto-pyramidal configuration, and comprises an outer housing of a plastic material and an inner housing of a light reflecting material in nested relation.

7. Film copying apparatus according to claim 6, in which:
   the inner housing is fabricated to provide a top wall, front wall, rear wall and opposite side walls; and
   upper portions of the opposite side walls are respectively inwardly offset.

8. Film copying apparatus according to claim 7 in which:
   electric lamp sockets are respectively mounted on the offset portions of the side walls for receiving light bulbs providing sources of light radiations in the light chamber.

9. Film copying apparatus according to claim 8, in which:
   the top portions of the inner and outer housings coact to provide an internal cavity for the accommodation of electric supply and control wiring for the light sources.

10. Film copying apparatus according to claim 3, comprising:

an extension cord carried by said housing structure for connecting the apparatus with an appropriate electric source and having a fused connection with a control circuit for said light sources;

a manually operable on-off switch means mounted on a top wall of the housing structure, and being connected in the control circuit for said light sources and being operable to control the film light exposure time interval.

11. Film copying apparatus according to claim 6, in which:

said light transmitting window member is peripherally removably supported by a plurality of peripheral brackets respectively mounted to said housing structure by a mounting screw which also retains the inner and outer housings in said nested relation.

* * * * *